Figure 1A:
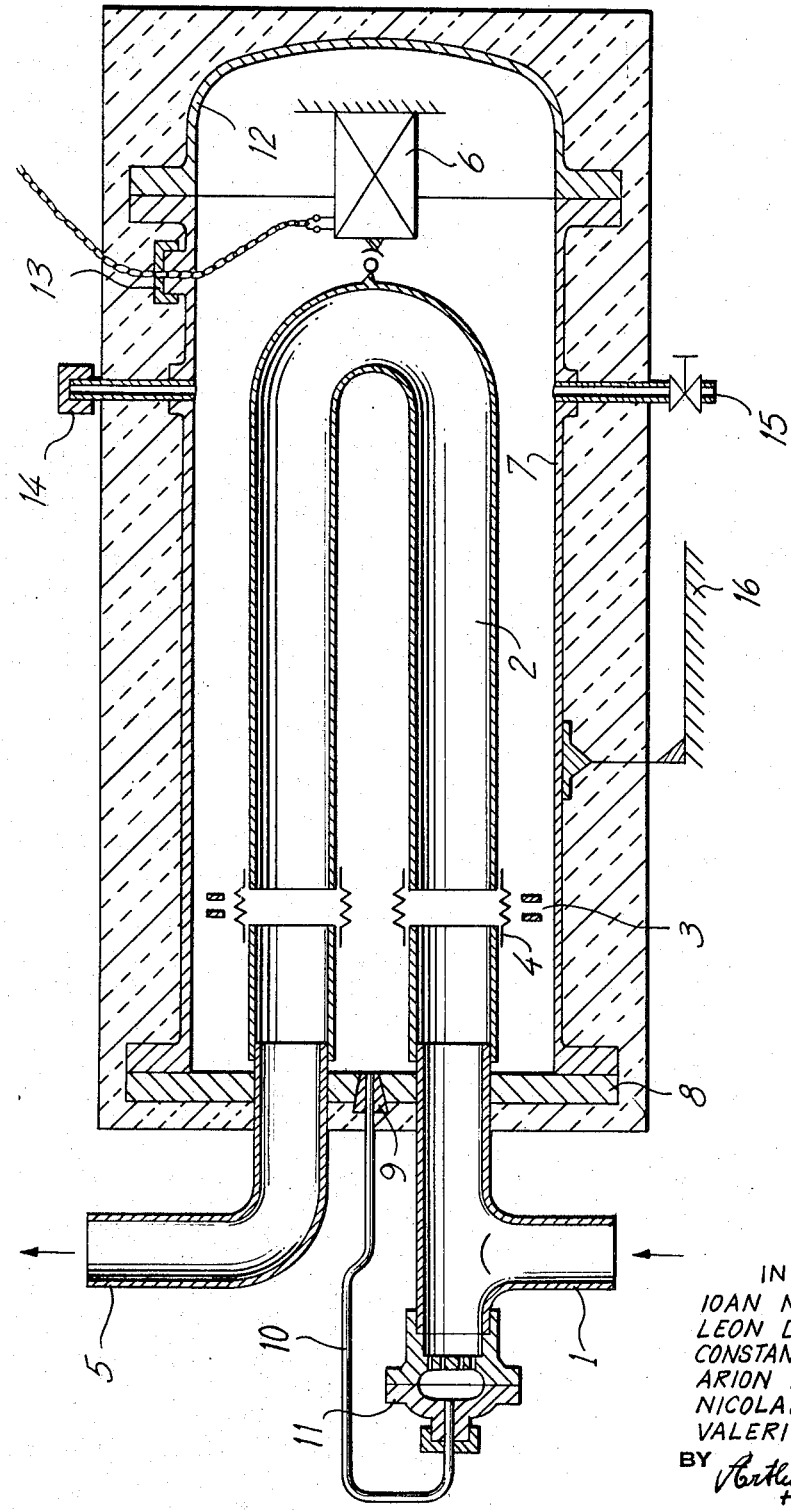

Oct. 10, 1967   I. NICOLAU ET AL   3,345,881
METHOD AND MEANS FOR MEASURING FLUID DENSITY
Filed Aug. 24, 1964   2 Sheets-Sheet 1

INVENTORS:
IOAN NICOLAU
LEON DOGARU
CONSTANTIN EVGHENIDE
ARION IONASCUT
NICOLAE TIHON
VALERIU MOTOROIU
BY Arthur O. Klein
their
ATTORNEY INVENTORS:
IOAN NICOLAU
LEON DOGARU
CONSTANTIN EVGHENIDE
ARION IONASCUT
NICOLAE TIHON
VALERIU MOTOROIU
BY *Arthur O. Klein*
 their
 ATTORNEY

# United States Patent Office 3,345,881
Patented Oct. 10, 1967

3,345,881
METHOD AND MEANS FOR MEASURING
FLUID DENSITY
Ioan Nicolau and Leon Dogaru, Campina, Constantin Evghenide, Bucharest, Arion Ionascut and Nicolae Tihon, Campina, and Valeriu Motoroiu, Comuna Poiana, Rumania, assignors to Ministerul Petrolului, Bucharest, Rumania
Filed Aug. 24, 1964, Ser. No. 391,680
Claims priority, application Rumania, Aug. 22, 1963, 46,829
7 Claims. (Cl. 73—434)

The present invention relates to a method and means for continuously and automatically measuring the fluid density under any pressure conditions.

The automatic and continuous fluid density measurement may be carried out by several methods, based on well-known principles such as those used in picknometers, air bubblers, displacement meters or radioactive source density meter types. A number of meter types are known, which permit the measuring methods to be applied according to the above mentioned principles. Of these meters, only those based on the radioactive source principle allow fluid density to be measured under any pressure conditions, that means in closed system, however, they have the following limitations: indirect density measurement, radiation hazard, high initial cost, periodical re-calibration according to the half-life of the radioactive source, temperature compensation.

A disadvantage of the existing density meter types, excepting those using a radioactive source, is that they can not be directly connected into the main circulating stream, but require a separate supply system (pressure regulator, or a tank and low pressure pump, or a constant level supplying vessel) as well as means (pressure pump) for returning the measured fluid to the main circulating stream. In addition, the measured values are not reliable, as in most cases the density measurements can not be applied to the whole circulating fluid, and they are carried out in open system, which may lead to the loss of the dissolved gas or light fractions contained in the mixture. Settling of the solids which may be present in the flowing fluid may also result in unreliable density readings. A further drawback of the above meters is that the fluid density is measured at temperatures and pressures other than those of the fluid in the main circulating stream, which sometimes causes undersirable changes in the properties of the fluid being measured.

Besides, in the case of siccative fluids, non-colloidal suspension fluids or gel developing fluid, the above mentioned density meters, excepting those using a radioactive source, if operated intermittently or stopped, require the operator to flush the apparatus with a cleaning liquid.

Another disadvantage of all these density meters is the necessity of using independent systems for temperature compensation. The float type fluid density meter using two floats located in separate overflow vessels, containing the reference fluid and the measured fluid respectively, and the air bubblers provided with separate bubbling vessels for the reference and measured fluids are the only meters ensuring temperature self-compensation, however they have the disadvantage that density measurements can be carried out only in the open system.

The existing fluid density meters require also special devices (dampers, level stabilizers, flow straighteners) to eliminate undersirable effects of the flowing fluid on the detector elements, since fluid flow is always turbulent while measuring fluid density.

The method according to the present invention eliminates the above mentioned disadvantages in that it allows fluid density to be measured under any pressure conditions, by measuring the buoyancy of a floating detector through which the fluid to be measured is flowing continuously, the floating detector being immersed in a vessel containing a reference fluid having a coefficient of expansion as close as possible to that of the fluid being measured, the same pressure and temperature conditions being provided for the reference fluid as for the measured fluid, so that the density is measured by continuously comparing the weights of the constant and known volumes of the measured fluid and reference fluid.

Measurement of the fluid density by the apparatus according to this method, is carried out by means of an electric weight transducer and a floating detector through which the fluid being measured flows continuously, the detector being provided for this purpose with flexible inlet and outlet connections, both the detector and the electric weight transducer being immersed in a vessel of reduced inside volume, thermally insulated on the outside, and filled with a reference fluid having a high dielectric constant and a coefficient of expansion very close to that of the measured fluid, said vessel communicating with the inlet which supplies the fluid to be measured to the detector by means of a diaphragm separator, which permits the equalization of the pressures inside and outside the floating detector.

Figure 1B:
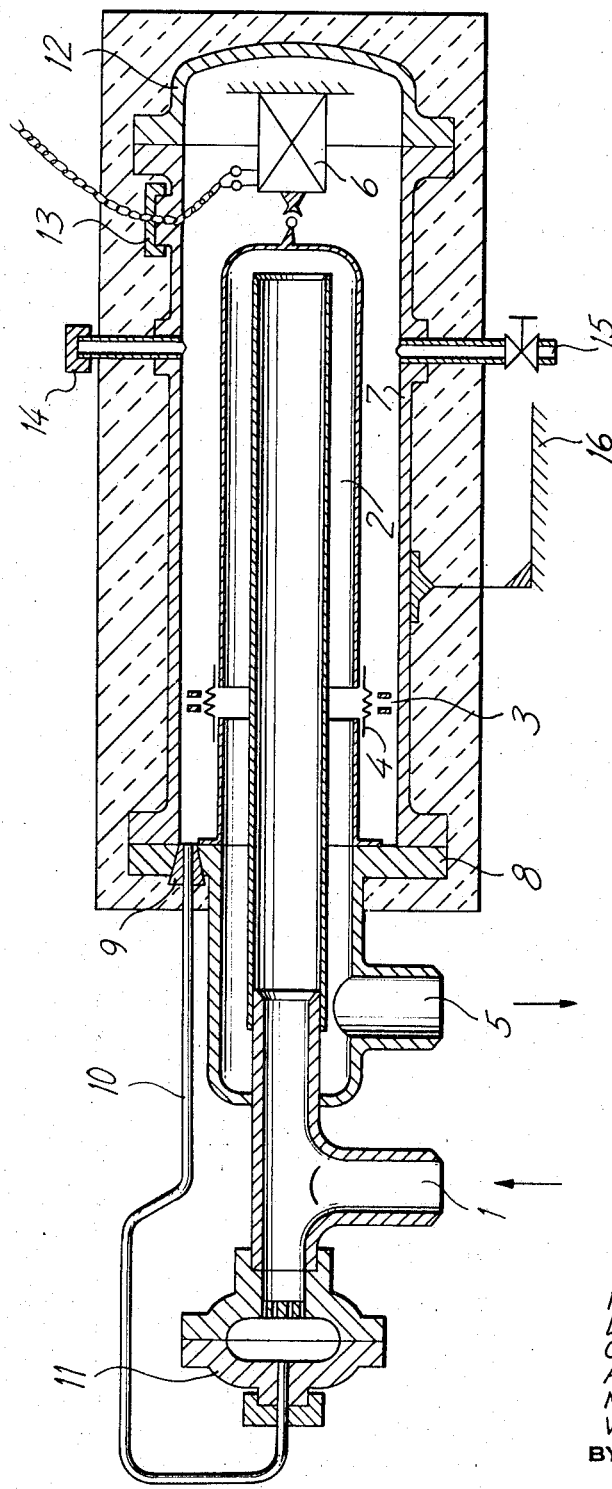

An example of an apparatus based on the method described by the invention is given below, in conjunction with FIG. 1 showing a longitudinal cross-section in a horizontal plane, of two designs, a and b, of this apparatus.

a—apparatus design involving a U-tube floating detector, b—apparatus design involving concentric tubes floating detector.

Referring now to the drawing in which identical and equivalent parts are designated with the same numerals there is illustrated the design of FIG. 1–a which comprises an inlet 1 through which the fluid to be measured enters the U-tube floating detector 2, pivotally mounted in the linkage 3, the U-tube detector being provided with flexible connections 4, all of known types. The measured fluid flows out of the floating detector 2 through the outlet 5. The floating detector 2 is connected to an electric weight transducer 6, of any known type. Both the floating detector and the electric weight transducer are immersed in a reference fluid having a coefficient of expansion as close as possible to that of the fluid being measured, and a high dielectric constant. The reference fluid is enclosed in a pressure vessel 7, provided with a flat cover plate 8, to which inlet 1 and outlet 5 are connected, and which carries a union fitting 9 for a conduit 10 leading to a diaphragm separator 11, of known type, also located on the inlet 1. Access to the electric weight transducer 6 in the pressure vessel 7 is made possible through a removable cover plate 12. The leads to the electric weight transducer 6 passes through a sealed plug 13 located in the wall of the pressure vessel 7, so as to make possible the connection to an indicating and recording system or an amplifying circuit for a control loop system in conjunction with which the apparatus may be used. For filling or removing the reference fluid, a filling opening 14 and a drain opening 15 are provided. For the alignment of the apparatus a base 16 is used, which carries means of a design well known in the art for the horizontal positioning of the apparatus.

The apparatus design shown in FIG. 1–b, is similar to the design in FIG. 1–a, except that it uses a concentric tube type floating detector. In this case the apparatus comprises an inlet 1, through which the measured fluid enters the floating detector 2 of the concentric tube type which is mounted so that it can pivot vertically about a linkage 3, the floating detector 2 being provided with flexible connections 4, all of known tyeps. The floating detector 2 is connected to an electric weight transducer 6, of any known type.

The floating detector 2 and the weight transducer 6 are immersed in a reference fluid having a coefficient of expansion very close to that of the fluid being measured, and high dielectric constant. The reference fluid is contained in a pressure vessel 7, thermally insulated on the outside and provided with a cover plate 8 which carries the outlet 5 for the measured fluid, as well as a union fitting 9 for a tube 10 leading to a diaphragm separator 11, of known type, the latter being located on the inlet 1. The pressure vessel 7 is provided with a removable cover plate 12, a sealed plug 13 of known type serving to lead out the leads of the electric weight transducer 6, and with a filling opeinng 14 and a drain opening 15 for the reference fluid to be introduced in and removed out of the pressure vessel. Alignment of the apparatus in the horizontal position is made possible by means of a design well known in the art of base 16.

Operation of the apparatus for both designs shown in FIGS. 1–a and 1–b is as follows: the fluid to be measured is supplied from the main circulating stream either through a by-pass or directly, permitting the fluid to circulate through the density meter at the total or partial flowing rate of the main stream, depending upon the total flow rate of the main stream and the size of the apparatus. Throughout the operations the pressure and the temperature, the solution gas or light fraction content, or the solid content are held at the same values as in the main flowing stream. The fluid entering inlet 1 flows through the floating detector 2, causing it to rotate relative to the linkage 3, upwardly or downwardly, depending on the weight difference between the amount of the fluid contained in the floating detector 2 and the amount of the reference fluid displaced by the floating detector 2, as well as on the balancing of the weight of the floating detector when empty. The resulting buoyant force acting on the floating detector 2 which is directly proportional to the density of the measured fluid, is being directly measured by the electric weight transducer 6, immersed along with the floating detector 2 in the reference fluid contained in the pressure vessel 7. The measured fluid is then continuously returned to the main circulating stream through the outlet 5.

The diaphragm separator 11 located on the inlet 1 and communicating with the vessel 7 through the conduit 10, allows the pressure of the measured fluid contained in the floating detector 2 and that of the reference fluid outside the floating detector to be held equal at all times. Thus, owing to the zero pressure differential at which the apparatus is being operated, the safe use of the flexible connections 4 and the thin-walled floating detector 2 is possible, regardless of the measured fluid working pressure. At the same time, owing to the thin walls of the floating detector 2, the close thermal contact between the measured fluid flowing continuously through the detector 2 and the small amount of the reference fluid contained in the pressure vessel 7, permits the temperature equalization of the two fluids. Thus, assuming that the coefficient of expansion of the reference fluid is very close to that of the measured fluid-self-compensation of the temperature changes is always possible, since density measurements are carried out by comparing the weights of two constant and known fluid volumes having the same temperature. Any undesirable influence of the ambient temperature is avoided by the outside thermal insulation of the apparatus. The reference fluid volume differences which occur due to the temperature changes in the measured fluid, are compensated by the distortion of the diaphragm in the separator 11, which is so sized as to correspond to the total volume of the reference fluid contained in the apparatus and to the working temperature range for which the apparatus is designed. The apparatus sensitivity is not a function of the specific weight of the reference fluid. In fact, the weight of the floating detector when filled with the measured fluid (G), said weight being measured by the transducer 6, is given by the relation $$G = G_0 + V_0(\gamma_m - \gamma_r)$$

where: $G_0$=the weight of the floating detector when empty; $V_0$=the outside volume of the floating detector, $\gamma_m$=specific weight of the measured fluid, $\gamma_r$=specific weight of the reference fluid. Since ($G_0$) is constant and ($V_0 \cdot \gamma_r$) is also constant, and these values may be initially balanced or may represent a calibration constant of the scale, it follows that the weight of the floating detector when filled with the fluid being measured, is a function of the specific weight of this fluid, according to the relation: $G = K + V_0 \cdot \gamma_m = f(\gamma_m)$.

It is also to be noted that the apparatus sensitivity is not influenced by the floating detector volume changes due to the expansion or contraction of the floating detector when temperature changes occur in the measured fluid, as the volumes or weights of the measured fluid and reference fluid being compared are proportional throughout the measurements, provided that the coefficients of expansion of the two fluids are very close to each other.

The method and apparatus presented in this invention have the following advantages:

fluid density can be measured by means of this method and apparatus at any pressure in closed systems, safe and easy operating conditions being assured;

the apparatus can be directly connected into the main circulating stream, since it does not require any separate means for the fluid to flow out of and back into the main stream;

the fluid density measurements are reliable since they are carried out for the total flowing rate under unaltered conditions as to pressure, temperature, solution gas or light fraction content, solid content, etc.;

flushing of the apparatus with cleaning fluid under pressure is possible;

temperature self-compensation is provided;

undesirable movements of the floating detector are self-dampened;

the apparatus may be used for other measurements calling for close system operation, such as: measurement of the water content of the crude oil, measurement of solid suspension content, etc.

Although our invention has been illustrated and described with reference to the preferred two embodiments thereof, we wish to have it understood that it is in no way limited to the details of such embodiments but is capable of numerous modifications within the scope of the appended claims.

We claim:
1. An apparatus of the character described for automatically measuring fluid density, comprising in combination, sealed pressure vessel means for storing a first reference fluid therein; detector means operatively mounted in said sealed pressure vessel means so as to float therein, said floating detector means having an inlet and an outlet and being adapted to have a second fluid, the fluid density of which is to be measured by said apparatus, continuously flow therethrough; an electric weight transducer mounted in said sealed pressure vessel means and operatively connected to said floating detector means, and pressure equalization means operatively connecting said floating detector means and said sealed pressure vessel means for equalizing the pressures of said first reference fluid and said second fluid, whereby when said electric weight transducer measures the buoyancy of said floating detector means in said sealed pressure vessel means the fluid density of said second fluid is accordingly determined.

2. The apparatus for automatically measuring fluid density as set forth in claim 1, wherein said pressure equalization means comprise a diaphragm separator which is in communication at one side thereof with said sealed pressure vessel means and at the other side thereof with said floating detector means.

3. The apparatus for automatically measuring fluid density as set forth in claim 2, wherein said sealed pressure vessel means has an outlet and an inlet for respectively filling and emptying said sealed pressure vessel means with said first reference fluid.

4. The apparatus for automatically measuring fluid density as set forth in claim 2, wherein said sealed pressure vessel means includes fluid tight plug means, and electric leads mounted in said plug means and connected to said electrical transducer for transmitting the measurements thereof by means of electrical impulses to a measuring instrument outside said pressure sealed vessel means.

5. The apparatus for automatically measuring fluid density as set forth in claim 1, wherein the coefficients of expansion of said first and second fluids are selected so as to differ only slightly from each other.

6. The apparatus for automatically measuring fluid density as set forth in claim 1, wherein said fluid detector means comprise a U-shaped conduit the two legs of which are supported in the walls of said sealed pressure vessel means, said U-shaped conduit having at least one elastic portion adapted to deform according to the external forces to which said U-shaped conduit is subjected due to the buoyancy thereof in said first reference fluid stored in said sealed pressure vessel means in which it is immersed.

7. The apparatus for automatically measuring fluid density as set forth in claim 1, wherein said floating detector means comprise a first tubular container projecting into said sealed pressure vessel means and being connected to the outlet of said floating detector means, said tubular container having at least one elastic wall portion adapted to deform according to the external forces to which said tubular container is subjected to the buoyancy thereof in said first reference fluid stored in said sealed pressure vessel means in which it is immersed, and an open ended tube concentrically mounted in said tubular container, one end of said open ended tube being connected to the inlet of said floating detector means.

References Cited

UNITED STATES PATENTS

| 1,424,403 | 8/1922 | Hartman et al. | 73—451 |
| 2,432,039 | 12/1947 | Plank | 73—434 |
| 3,138,955 | 6/1964 | Uttley | 73—434 |

FOREIGN PATENTS

| 12,197 | 1913 | Great Britain. |

JAMES J. GILL, *Acting Primary Examiner.*

RICHARD C. QUEISSER, *Examiner.*

J. FISHER, D. SCHNEIDER, *Assistant Examiners.*